United States Patent
Schram et al.

(10) Patent No.: US 9,417,446 B2
(45) Date of Patent: Aug. 16, 2016

(54) METHOD OF MANUFACTURE

(71) Applicant: Amazon Technologies, Inc., Seattle, WA (US)

(72) Inventors: Ivar Schram, Weert (NL); Ernest Phaff, Nuenen (NL); Jacco Van Der Gaag, Mierlo (NL); Henk Leenen, Weert (NL); Harco Jansen, Veldhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/228,773

(22) Filed: Mar. 28, 2014

(65) Prior Publication Data
US 2014/0211292 A1    Jul. 31, 2014

Related U.S. Application Data

(63) Continuation of application No. PCT/EP2013/073296, filed on Nov. 7, 2013.

(30) Foreign Application Priority Data

Nov. 8, 2012  (GB) .................................. 1220155.4

(51) Int. Cl.
| | | |
|---|---|---|
| *G02B 3/12* | (2006.01) | |
| *G02B 1/06* | (2006.01) | |
| *G02B 26/00* | (2006.01) | |
| *B05C 1/00* | (2006.01) | |
| *B05D 1/26* | (2006.01) | |
| *G09G 3/34* | (2006.01) | |

(52) U.S. Cl.
CPC ................ *G02B 26/005* (2013.01); *B05C 1/00* (2013.01); *B05D 1/26* (2013.01); *G09G 3/348* (2013.01); *G09G 2300/0426* (2013.01)

(58) Field of Classification Search
CPC ....... G02B 3/14; G02B 26/005; G02B 26/004
USPC .................................................. 359/665, 666
See application file for complete search history.

(56) References Cited

U.S. PATENT DOCUMENTS

2004/0234690 A1    11/2004  Hiruma
2011/0195258 A1*   8/2011   Fan et al. ...................... 428/447

FOREIGN PATENT DOCUMENTS

| JP | 2006181566 A | 7/2006 |
|---|---|---|
| TW | 201107047 A | 3/2011 |
| WO | 03071346 A1 | 8/2003 |
| WO | 2008125644 A1 | 10/2008 |
| WO | 2009065909 A1 | 5/2009 |
| WO | 2009106546 A1 | 9/2009 |
| WO | 2010133690 A1 | 11/2010 |
| WO | 2011135044 A1 | 11/2011 |
| WO | 2012126851 A1 | 9/2012 |
| WO | 2013079710 A1 | 6/2013 |

* cited by examiner

*Primary Examiner* — William Choi
(74) *Attorney, Agent, or Firm* — EIP US LLP

(57) ABSTRACT

A method of manufacturing an electrowetting element includes: providing a layer of a first liquid on a first area of a first support plate; providing a layer of a second liquid on the layer of first liquid; and providing a second support plate on the layer of the second liquid by moving the second support plate along a surface of the layer of the second liquid.

25 Claims, 3 Drawing Sheets

METHOD OF MANUFACTURE

CROSS REFERENCE TO RELATED APPLICATIONS

This application is a continuation under 35 U.S.C. §120 of PCT Application No. PCT/EP2013/073296 filed Nov. 7, 2013.

BACKGROUND

A method of providing a layer of a first fluid and a second fluid on an area of a surface of a first support plate for use in manufacturing an electrowetting element is known. After providing the first and second fluid layers, a second support plate is applied onto the second fluid to form a closed space between the support plates. It is necessary to use significantly excess second fluid to compensate for second fluid which is spilled and wasted when applying the second support plate. Further, applying the second support plate in the known method introduces air into the closed space and can introduce contamination.

It is desirable to provide an improved method for manufacturing an electrowetting display device.

DETAILED DESCRIPTION

Figure 1:
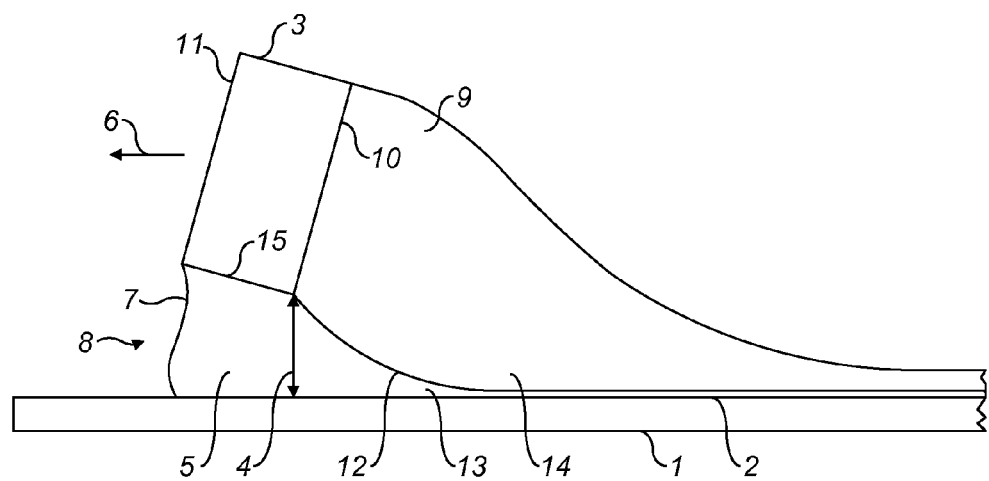
FIG. 1 shows an apparatus for depositing a layer of first liquid and second liquid.

The entire contents of the following patent documents are incorporated by reference herein:
1. GB 1220154.4 filed Nov. 8, 2012
2. PCT/EP2013/073296 filed Nov. 7, 2013.

In embodiments, there is provided a method of manufacturing an electrowetting element, the method including:

providing a layer of a first liquid on a first area of a surface of a first support plate, providing a layer of a second liquid on the layer of first liquid, the first liquid and the second liquid being immiscible, and the first area having a higher wettability for the first liquid than the second liquid, and providing a second support plate on the layer of the second liquid by moving the second support plate along a surface of the layer of the second liquid.

By moving the second support plate along the surface of the second liquid layer, an amount of second liquid used during the manufacture method may be reduced compared with known methods which apply the second support plate down onto the second liquid and which spill and waste second liquid squeezed from between the support plates. Moreover, compared with known systems, moving the second support plate along the layer of second liquid reduces trapping of air, or any gas in the manufacturing environment, between the second support plate and the second liquid layer; this yields an electrowetting element of a higher quality and reduces or eliminates the need to remove air in an additional manufacturing step. Further, the method reduces the handling of support plates during manufacture of an electrowetting element, and reduces potential contamination of the liquids before the second support plate is applied; thus the method is cleaner than known methods. Moreover, the method of embodiments is faster than known methods.

In an embodiment, the second support plate is moved along the surface of the layer of the second liquid by an applicator used to provide the layer of the second liquid. This gives an efficient and simple method of providing the second support plate, in combination with a method of providing the second liquid layer. Therefore, with minor adaptations, the applicator for the second liquid may be configured to provide the second support plate. For example, the second support plate may be attached to a trailing side of the applicator and is moved along the layer of the second liquid by moving the applicator relative to the first support plate, to provide the second support plate on the layer of the second liquid.

In an example, the applicator is moved over the first support plate, thereby pulling the second support plate along the surface of the layer of the second liquid.

In further embodiments, the applicator is arranged to provide the layer of the first liquid in advance of providing the layer of the second liquid. Therefore, a single applicator device may be used to provide the layer of the first liquid, the layer of the second liquid and the second support plate.

In an example, the applicator is an elongate applicator, an elongate gap being formed between the applicator and the surface, the gap being filled with an elongate globule of the first liquid, and an amount of the second liquid being arranged in contact with the applicator and with the globule, the method including the step of applying a relative motion between the applicator and the surface of the first support plate, said amount of second liquid being arranged only on a trailing side of the applicator.

In a further embodiment, the method includes aligning the second support plate with the first support plate after said providing of the second support plate on the layer of the second liquid.

In another embodiment, the method includes attaching the second support plate to the first support plate to seal the layer of the first liquid and the layer of the second liquid within a space between the first support plate and the second support plate.

In a further embodiment, the method includes compressing the first support plate and the second support plate towards each other, to define a distance between the first support plate and the second support plate. Since the second support plate is provided by moving the second support plate along the surface of the second liquid, a distance between the first support plate and the second support plate, when the second support plate is provided, is closer to a desired distance between the support plates of the manufactured electrowetting element than for the known methods. Therefore, less compressing is needed than in known systems resulting in less spilling and wasting of second liquid.

In an example, the first support plate and the second support plate are attached together by a sealing member, the sealing member being fixed after said compressing.

According to further embodiments, there is provided apparatus for manufacturing an electrowetting element, wherein the apparatus comprises:

a first applicator for providing a layer of a first liquid on a first area of a surface of a first support plate;

a second applicator for providing a layer of a second liquid on the provided layer of the first liquid, the first liquid and the second liquid being immiscible, and the first area having a higher wettability for the first liquid than the second liquid, and a third applicator for providing a second support plate on the provided layer of the second liquid by moving the second support plate along a surface of the layer of the second liquid.

In an embodiment, the first applicator, the second applicator and the third applicator are combined in a single applicator device. Thus, simple apparatus may be used to provide the first liquid, the second liquid and the second support plate.

In an example, the first applicator is adapted for forming an elongate gap between the first applicator and the surface of the first support plate, and for filling the elongate gap with an elongate globule of the first liquid, to provide the layer of the first liquid;

the second applicator is adapted for providing an amount of the second liquid in contact with the second applicator and with the elongate globule, the apparatus being arranged to move the first applicator and the second applicator relative to the surface of the first support plate, for providing the amount of the second liquid only on a trailing side of the second applicator; and the third applicator is adapted for attaching to the second support plate and the apparatus is arranged to move the third applicator relative to the provided layer of the second liquid, for moving the second support plate along the surface of the provided layer of the second liquid.

Embodiments will now be described in detail.

FIG. 1 shows in cross-section an embodiment of an apparatus for providing a layer of a first liquid on a first area of a surface of a first support plate and a layer of second liquid on the first liquid layer, according to an embodiment. A plate 1, also shown in cross-section, has a surface 2 on which a layer of a first liquid is to be provided. An applicator 3 in the form of a bar or slide is suspended above the surface 2. The applicator and the surface form a gap 4, represented in the drawing by an arrow showing the minimum distance between the applicator and the surface. The applicator has a long axis perpendicular to the plane of the drawing; the gap is elongate in the direction of the long axis. The gap is filled with an elongate globule 5 of a first liquid.

In operation the slide 3 is moved over the surface 2 in a direction 6. The globule 5 has a leading interface 7 with a gas 8 in front of the applicator 3. The interface 7 extends from the surface 2 to the applicator 3. An amount 9 of a second liquid, having an elongate shape, is arranged only at a trailing side 10 of the applicator 3 and is in contact with the applicator. The trailing side 10 of the applicator is a side that faces away from the direction of motion 6. A side 11 of the applicator that faces the direction 6 is a leading side. The globule 5 has a trailing interface 12 between the first liquid and the second liquid. The first and second liquids are immiscible.

When the applicator 3 moves over the surface 2, the moving globule 5 of first liquid wets the still dry surface 2 of the plate 1 with a layer 13 of first liquid that decreases in thickness with distance from the applicator. After a certain distance, the thickness of the layer 13 becomes independent of the distance. Similarly, the amount 9 of second liquid provides a layer 14 of second liquid on the layer 13 of first liquid. In other words, the moving applicator 3 drags along a globule 5 of first liquid and an amount 9 of second liquid, both of which leave behind a layer 13, 14 on the surface 2.

The thickness of the layer 13 of first liquid that remains on the area of the surface after passage of the applicator depends, among others, on the size of the gap 4, its shape, the speed of movement of the applicator, the shape of the interface 12, viscosities of the liquids, the amount of first and second liquid applied to the applicator, interfacial tensions of the two interfaces, and the chemical contrast, i.e. the difference in hydrophobicity between the various combinations of the two liquids and the surface and the applicator.

The first liquid may be an alkane, such as hexadecane, or an oil, such as a hydro-carbon oil. The embodiment of FIG. 1 uses a silicone oil. The second liquid may be any liquid that is non-miscible with the first liquid. The second liquid may be polar or electroconductive, which is useful in some applications of the plate 1 covered with the first and second liquid. The embodiment shown uses water as second liquid. Alternatively the second liquid may comprise a combination of water and at least one non-aqueous component, or the second liquid may comprise a first non-aqueous component and a second non-aqueous component. An example of the first component is ethylene carbonate and an example of the second component is erythritol. The gas 8 can be any gas, such as air, nitrogen or argon. The embodiment uses air. Other immiscible liquids that can be used are fluorocarbon and liquid metals such as mercury.

The first area of the surface 2 shown in FIG. 1 has a higher wettability for the first liquid than for the second liquid, which prevents the second liquid from displacing the first liquid from the area. In the embodiment shown, the plate 1 can be covered by a hydrophobic layer, e.g. an amorphous fluoropolymer such as AF1600. The hydrophobic layer increases the tendency of the first liquid to join with the surface and repel the second liquid.

The shape of the interface 7 depends, among others, on the wettability of the surface 2 and the surface of the applicator 3 for the first liquid and the gas 8, and the dimensions of the gap 4. The shape of the interface 12 depends, among others, on the wettability of the surface of the applicator 3 for the first and second liquid, the shape of the applicator near the position where the interface 12 touches the applicator, and the dimensions of the gap. In the embodiment shown in FIG. 1, the shape can be changed by changing the tilt angle of the applicator.

The size of the gap between the applicator 3 and the surface 2 in the embodiment of FIG. 1 may be 50 micrometers. During the motion of the applicator the size can be kept constant by controlling the position of the applicator and/or the surface 2, as is known for example from the air floating solutions for FPD (i.e. flat panel display) slit coating of the company CoreFlow or the doctor blade gap control of the coating equipment of the company Keko Equipment.

The size of the globule 5 is also determined by the amount of first liquid deposited in the gap 4. The first liquid can be deposited in the gap using for example a syringe or a pump mechanism for dispensing the desired amount of first liquid in the gap from the trailing side of the applicator. The first liquid will disperse evenly within the gap because of capillary forces. The second liquid can be deposited at the trailing side 10 also by a syringe or a pump mechanism. Using a pump mechanism the amount of first and second liquid in contact with the applicator can be controlled; for example, they can be kept substantially constant during operation of the applicator. The second liquid may be applied after the first liquid has been deposited in the gap.

Figure 2:
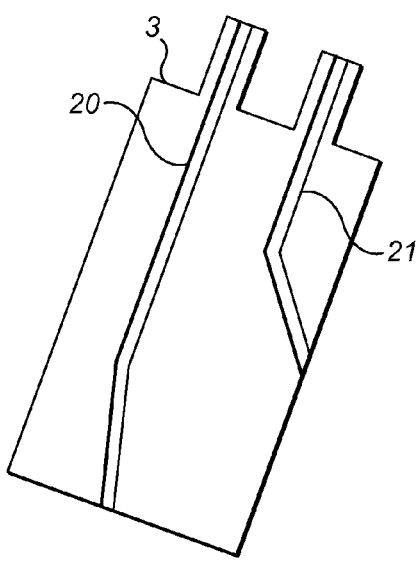
FIG. 2 shows an applicator having dispensing channels.

The first and second liquid may be deposited using a first tube outside the applicator and extending close to the gap 4 from the leading side 11 and a second tube extending close to the trailing side 10. Alternatively, the first and second liquid may be deposited using a first channel 20 in the applicator and a second channel 21 as shown in FIG. 2. The channels may be slits. A combination of tubes and channels is also feasible. A plurality of tubes and/or channels may be arranged along the length of the applicator 3.

Whereas the applicator 3 moves over a stationary surface 2 in the embodiment of FIG. 1, the applicator may also be stationary and the plate moves under the applicator. A combined movement of both applicator and plate is possible such that the applicator scans the surface of the plate.

The trailing side 10 of the applicator 3 may be hydrophilic to improve dragging the amount 9 of second liquid over the surface 2. A surface 15 of the applicator 3, facing the surface, can be made hydrophobic to improve the containment of the first liquid in the gap.

Although the cross-section of the applicator in the embodiment of FIG. 1 is a rectangle, it may also be round and have the shape of a rod. In the latter case, the position where the interface 12 touches the applicator may be fixed by making the trailing side of the rod hydrophilic and the side facing the gap hydrophobic. A rod-shaped applicator can be rotated to provide an extra process parameter for control, for instance for lifting the first liquid from the surface at areas that do not need to be coated.

Figure 3:
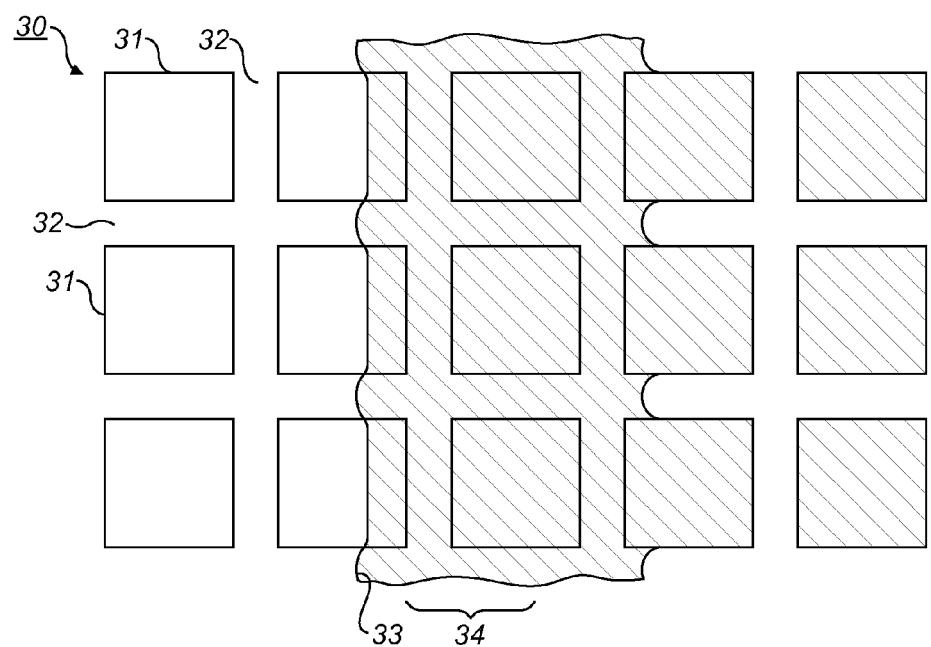
FIG. 3 shows a pattern of a surface partly covered by first liquid.

FIG. 3 shows a top view of a surface having a pattern. The pattern 30 comprises first areas 31, in this embodiment squares, having a higher wettability for the first liquid than for the second liquid. The squares may be made of a layer of AF1600. A neighbouring second area 32 has a higher wettability for the second liquid than for the first liquid. The second area 32 may be made of a layer of a variety of materials, including a photoresist, such as SU8. The second area may be formed by arranging a separate layer having the form of the second area on an uninterrupted layer that forms the first areas. When the first area is hydrophobic, the separate layer should be hydrophilic. The separate layer may be formed by e.g. a printing method or evaporation. The second areas may also be formed by walls having a height, which mechanically restrain the first liquid to the first area. The size of the first areas may be 170 micrometers by 170 micrometers and the width of the second areas 10 micrometers, but in other examples may have a different configuration, for example rectangular, circular or triangular. When the second areas are not flat but have the form of walls, the height may for example be 5 micrometers.

When a plate has a patterned surface as shown in FIG. 3, the deposition method provides a patterned layer of first liquid. The hatched area in the Figure is covered by the first liquid deposited by an applicator moving from right to left in the Figure. Line 33 is the intersection of the leading interface 7 with the surface 2. The surface to the left of the line 33 is covered with air. The wavy character of the line is caused by the different wettability of the areas 31 and 32 for air and first liquid. The surface under the gap of the applicator, indicated by a brace 34, is covered by the first liquid.

At the trailing side of the applicator the thickness of the layer 13 of first liquid decreases, as shown in FIG. 1. When the thickness has become sufficiently small, the second liquid will displace the first liquid from the second areas 32 because of the greater affinity of these areas for the second liquid than for the first liquid. The first liquid on the first areas 31 will not be displaced by the second liquid, because these areas have a greater affinity for the first liquid than for the second liquid. As a result the method deposits a layer of first liquid only on the first areas 31.

Since the thickness of the layer of first liquid behind the applicator is relatively small, i.e. smaller than the height of the gap, it is relatively easy for the second liquid to remove the layer of first liquid from the second areas 32. When the gap has a height of 50 micrometers, the layer of first liquid to be removed is thinner than 50 micrometers.

Figure 4:
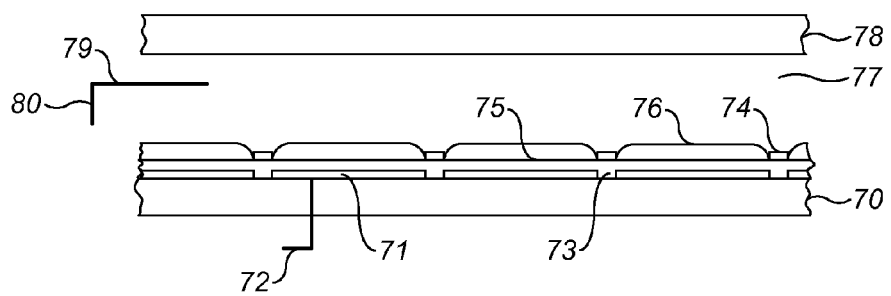
FIG. 4 shows a cross-section of an electrowetting element.

FIG. 4 shows a cross-section of an example of a series of electrowetting elements made according to embodiments. A first substrate 70 is provided with electrodes 71, deposited as a thin-film conductor on the substrate. Each electrode is connected to a signal line 72 for providing a voltage. The electrodes are covered by a thin hydrophobic layer 73 of the amorphous fluoropolymer AF1600. The first substrate with the layers applied to it forms a first support plate. A pattern of a thin hydrophilic layer 74 of SU8 divides the surface of the support plate in hydrophobic first areas 75 between the hydrophilic second areas 74. The size of the first areas may be 160 micrometers square, the second areas may have a width of 10 micrometers and may have a height of 3 to 6 micrometers; in other examples different dimensions are envisaged.

The first substrate 70, provided with the layers 71, 73 and 74, is subjected, similar to plate 1, to the method described above of providing a layer of first liquid on the area of the first support plate surface and providing a layer of second liquid on the layer of first liquid, using oil as first liquid and water as second liquid or any other combination of liquids, for example as given above. After carrying out the method the first areas 75 are uniformly covered by an oil layer 76 having a thickness of between 3 and 6 micrometers, for example 5 micrometers. The second areas 74 and the oil layer are covered by water 77. The water may contain salt to increase its electrical conductivity and to enlarge the temperature window for the method. The second liquid, water in this example, used during the method may be the same liquid used in the product that includes the support plate, which avoids changing the second liquid after the execution of the method by another liquid.

A second support plate 78 forms a closed space between the first and second support plate. The space is protected from the environment by seals, not shown in the Figure, attached to both support plates. The pattern of the layer 74 defines elements on the support plate to which the oil layer 76 is confined. Each element has an electrode 71. Another electrode 79, connected to a signal line 80, is in contact with the water 77, forming a common electrode for a plurality of elements. When a voltage is applied between the common electrode 79 and the electrode 71 of an element, the oil layer 76 in that element moves to the side of an element or breaks up and the first surface will at least partly be covered by the water 77. This so-called electrowetting effect is more fully described in international patent application WO03/071346. When the oil and/or the water have specific optical properties for absorption, reflection and/or transmission of light, the element can operate as a light valve. The electrowetting elements may be used in a display apparatus, in which a plurality of electrowetting elements forms a display device. A display driving system in the apparatus provides the voltages for setting the elements in the desired state.

A method of providing the second support plate on the layer of the second liquid will now be described, in accordance with embodiments of a method of manufacturing an electrowetting element.

Figure 5:
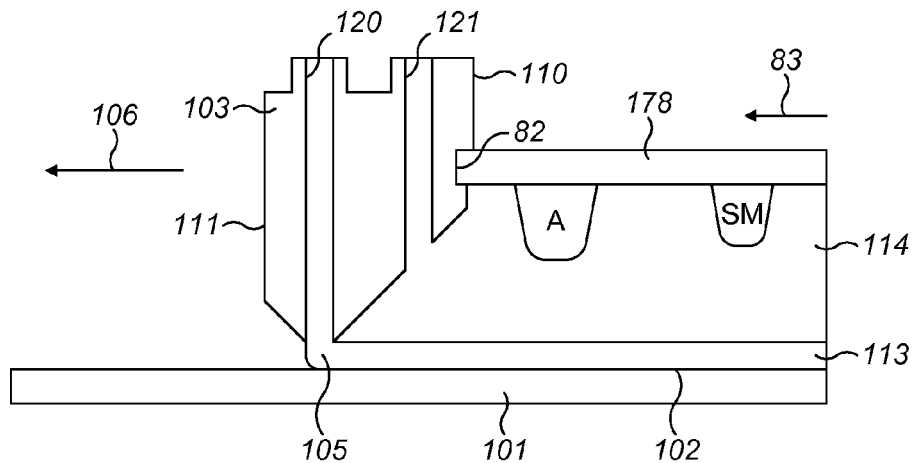
FIG. 5 shows schematically providing of a second support plate.

FIG. 5 illustrates schematically an example of apparatus for providing the second support plate on the second liquid layer. Features illustrated are similar to those illustrated previously in FIGS. 1 and 2; for such features, such as the applicator 3, the same reference numerals will be used here, incremented by 100; corresponding descriptions should be taken to apply here also.

In this example, in addition to the applicator 103 being arranged to provide the layer of the first liquid in advance of providing the layer of second liquid, the applicator 103 is arranged to provide a second support plate 178 on the second liquid layer 114. Thus, the applicator for providing the layer of the second liquid is used to provide the second support plate too. Specifically, the applicator 103 in this example is configured with a slot 82 in the trailing side 110 of the applicator for fixing an edge of the second support plate 178 into. For example, the second support plate may be fixed to the applicator by a mechanical bracket applied to the edge of the second support plate and then attached to the applicator, for example by clamping the mechanical bracket in the slot 82. Then, as the applicator 103 is moved relative to the first support plate, in the direction of motion 106, to provide the first and second liquid layers as described above, the applicator also moves, in this case pulls, the second support plate along a surface of the second liquid layer in a direction 83. Thus, the second support plate slides along the surface of a part of the second liquid layer which has already been provided.

In this example the second support plate covers and lies in contact with the second liquid layer as it is provided. Thus, the second liquid layer supports the second support plate during its movement. It is envisaged that the second support plate, particularly parts of the second support plate which have yet to be moved into contact with the surface of the second liquid layer, may further be supported by pads applied to an upper surface of the second support plate. The pads apply a vacuum to the second support plate, so as to keep the second support plate flat and at a distance above the first support plate which corresponds with the thickness of the first and second liquid layers having been provided by the applicator. The distance for providing the second support plate from the first support plate may be greater than a height of adhesive globules and a sealing member described below, to avoid contact between the adhesive globules and the sealing member whilst moving the second support plate along the surface of the second liquid layer.

Further, in this example, by the second support plate covering the second liquid layer as it is provided, a thickness of the second liquid layer is maintained after application. Without the second support plate immediately covering the second liquid layer after application, the second liquid has a tendency to contract due to dewetting on the first liquid layer and/or flowing over the edge of the first support plate. Such a contraction of the second liquid may be in the order of several millimeters and in known systems is a cause of spilling and wasting notable quantities of second liquid when a second support plate is applied.

In this example, once the second support plate has been provided on the second liquid layer, the first support plate and the second support plate are aligned with respect to each other. If the support plates have the same dimensions in length and width, then mechanical alignment may be used. Moreover, a surface tension between the second liquid and the second support plate may be used to assist alignment, as the second liquid may have a preference to remain between the first liquid and second support plate. To align the plates, the mechanical bracket may first be detached from the applicator; the vacuum pads may or may not be used to support the second support plate during the alignment.

In this example, the first support plate and the second support may then be attached to each other to seal the layer of the first liquid and the layer of the second liquid within the space between the first support plate and the second support plate. This may be achieved as follows:

Before providing the second support plate on the second liquid layer, the second support plate is provided with, on a surface to face the first support plate, a sealing member SM (see FIG. 5) for surrounding a space to be formed for enclosing the first and second liquids. Also, globules of adhesive A (see FIG. 5) are provided along an edge of the second support plate, on the surface of the second support plate to face the first support plate, outside of the sealing member. The adhesive globules may have a greater height than the sealing member; for example the adhesive globules may have a height of 100 to 150 micrometers and the sealing member may have a height of 80 to 120 micrometers. The adhesive and the sealing member at this stage are uncured, and may be for example Nagase XNR-5570 (supplied by Nagase, 1-1-17 Shinmachi, Nishi-ku, Osaka City, Osaka 550-8668, Japan).

Then, in this example, after the first liquid layer, the second liquid layer and the second support plate have been provided, and after the plate alignment, the edge of the second support plate having the adhesive globules is moved towards a corresponding edge of the first support plate so the adhesive globules contact the first support plate. Fine alignment of the first and second support plates relative to each other may then be conducted, using a camera and alignment marks on the support plates. The adhesive globules are then cured, for example using ultraviolet light, to hold the aligned support plates together.

Next, in this example, the first and second support plates are compressed towards each other to define a distance between the first and second support plates. The compression may be performed by passing the attached support plates between two counter rotating rollers. The nip between the rollers is set to a desired distance, corresponding with a desired distance between the outer surfaces of the first and second support plates; this in turn determines the distance of the space between the first and second support plates.

The support plates are fed between the rollers, with the leading edge to be fed being the edges attached with the adhesive globules. As the rollers compress the support plates together, the sealing member contacts the first support plate, if it has not already done so, and is compressed to a desired thickness, for example 25 micrometers, for sealing the first and second liquids within the space. During this compression, any surplus of the second liquid is squeezed out from between the support plates; since the second support plate may be moved along the second liquid layer at a distance of for example 200 micrometers from the surface of the first support plate facing the second support plate, there may be little surplus of second liquid.

Then, once the support plates have been compressed to the desired separation, after rolling the sealing member is cured using for example ultraviolet light.

In this way the support plates may be attached and the liquid layers sealed between the support plates.

Figure 6:
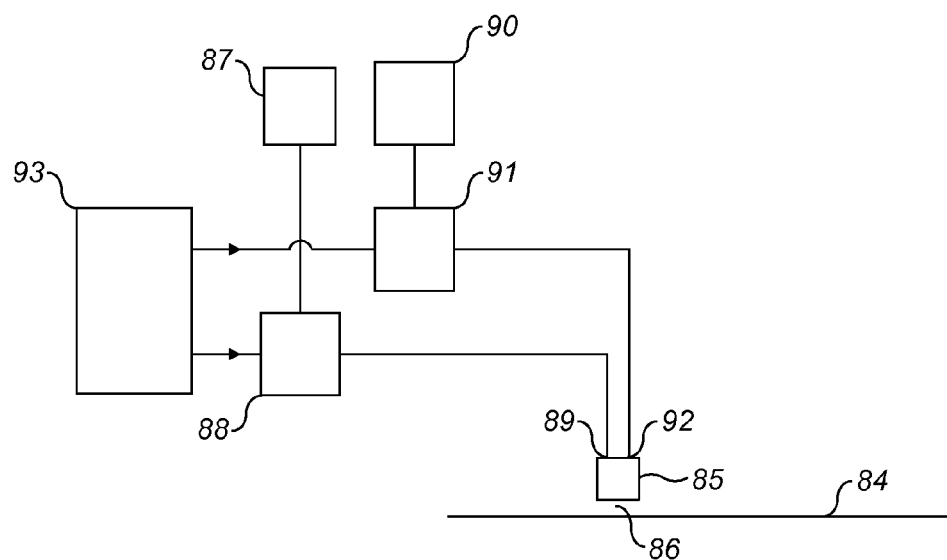
FIG. 6 shows an apparatus for carrying out a method in accordance with embodiments.

FIG. 6 shows an apparatus for providing a layer of first liquid and a layer of second liquid on a surface of a support plate according to an embodiment. The plate can be arranged on a stage 84. An applicator 85 forming a gap 86 with the surface is mounted on a translation stage, not shown in the Figure, that enables the applicator to scan over the stage 84. Alternatively, the applicator is fixed and the surface is mounted on a translation stage. A first container 87 for the first liquid is connected to a first control unit 88, e.g. a valve or a pump, that controls the amount of first liquid to be delivered to the applicator 85 via a connection 89. A second container 90 for the second liquid is similarly connected to a second control unit 91 for delivering the second liquid to the applicator via a connection 92. A controller 93 provides signals for setting the first and second controller to the desired settings. The apparatus may include a measurement device for determining the thickness of the deposited layer. The thickness value may be used as input for setting the control units. The apparatus may also include a device for measuring the shape and/or the size of the globule of first liquid or the volume of second liquid between the applicator and the surface, e.g. using a camera observing the applicator in the direction of its long axis, and use this input for setting the control units. The height of the dispenser above the surface may be kept at a desired value, for example by measuring the height at the two far ends of the elongate dispenser and maintaining these at equal values. The controller may also use manual input from an operator of the apparatus instead of measured values. As described above, the applicator for the first liquid and the second liquid may be adapted to provide the second support plate on the second liquid layer. Thus, the applicator of the first liquid, the second liquid and the second support plate may be arranged as a single applicator device, for example as described above. In other examples, a separate applicator may be used to provide the first liquid, the second liquid and/or the second support plate.

The method according to embodiments may be tuned using at least one of the following parameters: appropriate selection of the first liquid, the second liquid, the first support plate and/or the second support plate to adjust capillary forces between the liquids and the support plates; the viscosity of the first and/or second liquids; the speed of moving the applicator relative to the first support plate; and the distance between the first and second support plates during providing of the second support plate.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the accompanying claims.

What is claimed is:

1. A method of manufacturing an electrowetting element, the method comprising:
   providing a first liquid layer of a first liquid on a first area of a first support plate surface of a first support plate,
   providing a second liquid layer of a second liquid on the first liquid layer, the second liquid being at least one of polar or electroconductive, the first liquid and the second liquid being immiscible, and the first area having a higher wettability for the first liquid than the second liquid, and
   providing a second support plate on the second liquid layer by moving the second support plate into contact with a second liquid layer surface of the second liquid layer, the moving being along the second liquid layer surface.

2. A method according to claim 1, the moving the second support plate into contact with the second liquid layer surface comprising moving the second support plate along the second liquid layer surface using an applicator used to provide the second liquid layer.

3. A method according to claim 2, the second support plate attached to a trailing side of the applicator, the moving the second support plate into contact with the second liquid layer surface comprising moving a respective one of the applicator and the first support plate relative to a respective other of the applicator and the first support plate, to provide the second support plate on the second liquid layer.

4. A method according to claim 2, the moving the second support plate into contact with the second liquid layer surface comprising moving the applicator over the first support plate with the second support plate attached to a trailing side of the applicator, thereby pulling the second support plate along the second liquid layer surface.

5. A method according to claim 2, the providing the first liquid layer comprising the applicator depositing the first liquid layer in advance of the providing the second liquid layer.

6. A method according to claim 2, the applicator being an elongate applicator, the method comprising:
   positioning the elongate applicator relative to the first support plate surface, with an elongate gap between the elongate applicator and the first support plate surface,
   depositing an elongate globule of the first liquid in the elongate gap;
   depositing an amount of the second liquid on a trailing side of the elongate applicator, and in contact with the elongate applicator and with the elongate globule; and
   moving a respective one of the elongate applicator and the first support plate surface relative to a respective other of the elongate applicator and the first support plate surface.

7. A method according to claim 2, wherein the applicator has one or more of: a rectangular cross-section, a round cross-section, or a rod shape.

8. A method according to claim 1, comprising aligning the second support plate with the first support plate after the providing the second support plate on the second liquid layer.

9. A method according to claim 1, comprising attaching the second support plate to the first support plate to confine the first liquid layer and the second liquid layer between the first support plate and the second support plate.

10. A method according to claim 9, comprising moving the first support plate and the second support plate towards each other, to determine a distance between the first support plate and the second support plate.

11. A method according to claim 10, comprising, after the moving the first support plate and the second support plate towards each other, attaching the first support plate and the second support plate together with a sealing member.

12. A method according to claim 1, the providing the first liquid layer comprising providing the first liquid layer with an applicator and controlling a thickness of the first liquid layer such that the thickness is less than a distance between the applicator and the first support plate surface.

13. A method according to claim 1, wherein the first support plate surface comprises a plurality of first areas, comprising the first area, respectively separated by second areas having a higher wettability for the second liquid than for the first liquid and forming a pattern, the providing the first liquid layer comprising providing a patterned first liquid layer of the first liquid on the plurality of first areas.

14. A method according to claim 1, the moving the second support plate into contact with the second liquid layer surface comprising moving the second support plate along the second liquid layer surface at a distance from the first support plate corresponding to a combined first liquid layer thickness of the first liquid layer and a second liquid layer thickness of the second liquid layer.

15. A method according to claim 1,
    the moving the second support plate into contact with the second liquid layer surface comprising moving the second support plate at a distance from the first support plate greater than a sealing member height of a sealing member and greater than an adhesive globules height of adhesive globules, the sealing member and the adhesive globules each located on the second support plate between the first support plate and the second support plate.

16. Apparatus for manufacturing an electrowetting element, wherein the apparatus comprises:
    a first applicator for providing a first liquid layer of a first liquid on a first area of a first support plate surface of a first support plate;
    a second applicator for providing a second liquid layer of a second liquid on the first liquid layer, the second liquid being at least one of polar or electroconductive, the first liquid and the second liquid being immiscible, and the first area having a higher wettability for the first liquid than the second liquid, and
    a third applicator for providing a second support plate on the second liquid layer by moving the second support plate into contact with a second liquid layer surface of the second liquid layer, the moving being along the second liquid layer surface.

17. Apparatus according to claim 16, wherein the first applicator, the second applicator and the third applicator are combined in a single applicator device.

18. Apparatus according to claim 17, wherein one or more of:
    a trailing side of the single applicator device has a lower wettability for the first liquid than the second liquid, or
    a leading side of the single applicator device has a higher wettability for the first liquid than the second liquid.

19. Apparatus according to claim 16, wherein:
    the first applicator is elongate for being positioned relative to the first support plate surface, with an elongate gap between the first-applicator and the first support plate surface, and comprises a first channel for depositing an elongate globule of the first liquid in the elongate gap, to provide the first liquid layer;
    the second applicator comprises a second channel for depositing an amount of the second liquid on a trailing side of the first applicator, and in contact with the second applicator and with the elongate globule, the apparatus being arranged to move a respective one of: the first applicator and the second applicator, and the first support plate surface, relative to a respective other of the first applicator and the second applicator, and the first support plate surface; and
    the third applicator is adapted for attaching to the second support plate and the apparatus is arranged to move a respective one of the third applicator and the second liquid layer relative to a respective other of the third applicator and the second liquid layer, for moving the second support plate into contact with the second liquid layer surface.

20. A method of manufacturing an electrowetting element, the method comprising:
    providing a first liquid layer of a first liquid on a first area of a first support plate surface of a first support plate,
    providing a second liquid layer of a second liquid on the first liquid layer using an applicator, the first liquid and the second liquid being immiscible, and the first area having a higher wettability for the first liquid than the second liquid, and
    providing a second support plate on the second liquid layer by moving the second support plate along a second liquid layer surface of the second liquid layer using the applicator.

21. A method according to claim 20, wherein the second support plate is attached to a trailing side of the applicator and is the moving the second support plate along the second liquid layer surface comprises moving a respective one of the applicator and the first support plate relative to a respective other of the applicator and the first support plate, to provide the second support plate on the second liquid layer.

22. A method of manufacturing an electrowetting element, the method comprising:
    providing a first liquid layer of a first liquid on a first area of a first support plate surface of a first support plate,
    providing a second liquid layer of a second liquid on the first liquid layer, the first liquid and the second liquid being immiscible, and the first area having a higher wettability for the first liquid than the second liquid, and
    providing a second support plate on the second liquid layer by moving the second support plate into contact with a second liquid layer surface of the second liquid layer, the moving being along the second liquid layer surface,
    wherein the surface of the first support plate comprises a plurality of first areas, comprising the first area, respectively separated by second areas having a higher wettability for the second liquid than for the first liquid and forming a pattern, the providing the first liquid layer comprising providing a patterned first liquid layer of the first liquid on the plurality of first areas.

23. A method according to claim 22, wherein the moving the second support plate into contact with the second liquid layer surface comprises moving the second support plate along the second liquid layer surface using an applicator used for the providing the second liquid layer.

24. A method according to claim 23, wherein the second support plate is attached to a trailing side of the applicator, the moving the second support plate into contact with the second liquid layer surface comprising moving a respective one of the applicator and the first support plate relative to a respective other of the applicator and the first support plate, to provide the second support plate on the second liquid layer.

25. Apparatus for manufacturing an electrowetting element, wherein the apparatus comprises:
    a first applicator for providing a first liquid layer of a first liquid on a first area of a first support plate surface of a first support plate;
    a second applicator for providing a second liquid layer of a second liquid on the first liquid layer, the first liquid and the second liquid being immiscible, and the first area having a higher wettability for the first liquid than the second liquid, and
    a third applicator for providing a second support plate on the second liquid layer by moving the second support plate along a second liquid layer surface of the second liquid layer,
    wherein the first applicator, the second applicator and the third applicator are combined in a single applicator device comprising one or more of: a trailing side with a lower wettability for the first liquid than the second liquid, or a leading side with a higher wettability for the first liquid than the second liquid.

* * * * *